United States Patent
Cooley

(10) Patent No.: US 11,564,513 B2
(45) Date of Patent: Jan. 31, 2023

(54) BEDDING

(71) Applicant: Danielle Gobert Cooley, Fulton, MD (US)

(72) Inventor: Danielle Gobert Cooley, Fulton, MD (US)

(*) Notice: Subject to any disclaimer, the term of this patent is extended or adjusted under 35 U.S.C. 154(b) by 428 days.

(21) Appl. No.: 16/752,024

(22) Filed: Jan. 24, 2020

(65) Prior Publication Data

US 2020/0315378 A1    Oct. 8, 2020

Related U.S. Application Data

(60) Provisional application No. 62/827,969, filed on Apr. 2, 2019.

(51) Int. Cl.
  *A47G 9/02* (2006.01)
  *A47G 9/04* (2006.01)
  *B32B 5/26* (2006.01)

(52) U.S. Cl.
  CPC .............. *A47G 9/0238* (2013.01); *A47G 9/04* (2013.01); *B32B 5/26* (2013.01); *B32B 2307/304* (2013.01); *B32B 2451/00* (2013.01)

(58) Field of Classification Search
  CPC ............................. A47G 9/0234; A47G 9/04
  See application file for complete search history.

(56) References Cited

U.S. PATENT DOCUMENTS

| | | | | |
|---|---|---|---|---|
| 2,183,360 A | * | 12/1939 | Sussman | A47G 9/0261 5/501 |
| 2,799,870 A | * | 7/1957 | Sullivan | A47G 9/0238 5/495 |
| 2,810,921 A | * | 10/1957 | Seidenberg | A47G 9/0238 5/501 |
| 4,903,361 A | * | 2/1990 | Tang | A47G 9/02 5/500 |
| 5,070,561 A | * | 12/1991 | Keidser | A47G 9/0284 5/482 |
| 5,134,736 A | * | 8/1992 | Anthony | A47C 21/022 5/500 |
| 5,208,927 A | | 5/1993 | Lachmar | |
| 6,098,219 A | | 8/2000 | Miller | |
| 6,243,896 B1 | | 6/2001 | Osuna | |
| 6,886,197 B1 | | 5/2005 | Madigan | |
| 8,122,541 B1 | | 2/2012 | Georgatos | |
| 8,407,836 B1 | | 4/2013 | Sacherman | |

(Continued)

*Primary Examiner* — Eric J Kurilla
(74) *Attorney, Agent, or Firm* — U. Maryland Balt. Carey School of Law MIPLRC/IPEC

(57) ABSTRACT

A bedding assembly may comprise a touch layer, a warmth layer, and a decorative layer. The touch layer and warmth layer may functionally correspond to a top sheet and a duvet insert in a conventional bedding system, respectively. The decorative layer is different than conventional duvet covers, since it does not enclose a duvet insert. The layers may be stacked and attached to one another through a series of fasteners that are located largely along the edges of each layer. The upper surface of the touch layer may attach to the lower surface of the warmth layer, and the upper surface of the warmth layer may attach to the lower surface of the decorative layer. A top portion of the touch layer may also fold over the warmth layer and attach to a top portion of the upper surface of the decorative layer.

10 Claims, 6 Drawing Sheets

(56) References Cited

U.S. PATENT DOCUMENTS

| | | | |
|---|---|---|---|
| 8,646,133 B2* | 2/2014 | Tepper | A47G 9/0261 5/501 |
| 9,523,165 B2 | 12/2016 | Crispino | |
| 9,549,625 B1 | 1/2017 | Wilkinson | |
| 9,826,848 B2 | 11/2017 | Stinchcomb | |
| 2004/0031098 A1* | 2/2004 | Hollander | A47G 9/02 5/482 |
| 2009/0151072 A1* | 6/2009 | Jones, III | A47G 9/0246 5/486 |
| 2010/0251482 A1 | 10/2010 | MacDonald | |
| 2017/0127855 A1* | 5/2017 | Wootten, Jr. | A47G 9/0261 |
| 2018/0027998 A1* | 2/2018 | Heiman | A47G 9/0223 |
| 2018/0092473 A1* | 4/2018 | Stewart | A47G 9/0207 |

* cited by examiner

BEDDING

CROSS-REFERENCE

Not applicable.

TECHNOLOGICAL FIELD

The present invention relates to bedding.

BACKGROUND

Individuals may toss and turn while sleeping, which tangles sheets and shifts a duvet over time. To relieve frustrations with sheet tangling, many people sleep without a top sheet (also sometimes referred to as a flat sheet). This can be unsanitary, as many people rarely wash duvet covers or thick comforters or quilts. Warmth may also be lessened if an individual foregoes a top sheet.

Some systems attach a top sheet to a duvet cover. These systems, while they may address the tangling problem somewhat, do not alleviate other issues inherent in duvet covers—such as duvet shifting and the need for assembly—and they still leave much of the duvet cover exposed in a way that does not significantly reduce the need to launder it. Other systems include covers with corner ties to attach the duvet to the cover from the inside. These attachments are often insufficient to eliminate duvet shifting within the cover. Another method of dealing with duvet shifting is to use an uncovered blanket or duvet, eliminating the cover entirely. However, uncovered blankets and duvets are difficult to launder because of their size and composition.

The laundering of bedding can also be difficult. Hindrances and frustrations related to frequent linen laundering include the tedium of disassembling and reassembling all bedding and the challenge of washing larger items, whether due to their poor fit in a household laundry machine or a lack of desire to transport and pay for washing at a laundromat. To deal with this, people tend to launder their bed linens far less frequently than is recommended.

Further, bed making sometimes takes substantial time and effort. To avoid this, many people simply do not make their beds, leaving their beds disheveled and sloppy looking.

DETAILED DESCRIPTION

The present invention will now be described in more detail with reference to the accompanying drawings. The accompanying drawings show exemplary embodiments of the invention. The invention may, however, be embodied in many different forms and should not be construed as limited to the embodiments set forth herein.

The object of the present invention is to overcome the deficiencies in the prior art by providing a modular bed linen system comprising attachable components.

In this disclosure, the terms "longer" and "shorter" refer to the longitudinal dimension extending from the head of the bed to the foot of the bed. In other words, "longer" and "shorter" refer to a head-foot axis of the bed. For example, a shorter bedding layer will have shorter side edges that result in the edges towards the top and bottom of the bed being closer together. The terms "wider" and "narrower" refer to the latitudinal dimension extending between the sides of the bed. In other words, "wider" and "narrower" refer to a side-side axis of the bed. For example, a narrower bedding layer will have shorter edges at the head and foot of the bed that result in the side edges being closer together.

A bedding assembly 100 may comprise a touch layer 110, a warmth layer 120, and a decorative layer 130. The touch and warmth layers may functionally correspond to a top sheet and a duvet insert, respectively, in a conventional bedding system. In an embodiment, these layers may be stacked and attached to one another through a series of fasteners that are located largely along the edges of each layer.

Figure 1A:
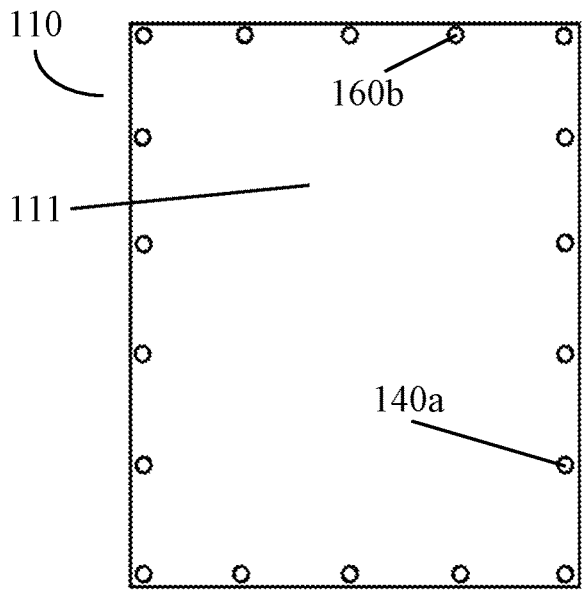
FIG. 1a is a top view of the touch layer of an embodiment of the present invention.

Referring to FIG. 1a, the touch layer 110 may comprise an upper surface 111. A first plurality of attachment points 140 may comprise fasteners 140a on the upper surface 111 of the touch layer 110. After assembly of the components described herein, fasteners 140a may attach to complementary fasteners 140b on a lower surface 122 of the warmth layer 120 (shown in FIG. 2b). The fasteners shown throughout the figures only illustrate the side of the fastener that attaches to another fastener. In an embodiment, bidirectional snaps or other bidirectional fasteners may be used, which would be visible on both the upper and lower surfaces of the layer.

In an embodiment, the warmth layer 120 may be shorter than the touch layer 110 such that the side edges of the warmth layer 120 are shorter than the side edges of the touch layer 110. The edges at the foot of the bed and the edges at the head of the bed may be the same length. The fasteners 140b may be dispersed around three edges of the lower surface of the warmth layer 122: the edge at the foot of the bed and the two side edges. The fasteners 140*a* on the upper surface 111 of the touch layer 110 may be correspondingly dispersed, so as to align with the fasteners 140*b* when the warmth layer 120 is placed on the touch layer 110. In other words, the fasteners 140*a* on the upper surface of the touch layer may be dispersed along the edge at the foot of the bed and along portions of the side edges. The fasteners 140*a*, 140*b* at the first plurality of attachment points 140 may fit together to removably attach the touch layer 110 to a warmth layer 120. In an embodiment, the fasteners comprise snaps. In other embodiments, the fasteners may comprise buttons, hook and loop fasteners, magnets, clips, and the like, as would be understood by persons of ordinary skill in the art.

In an embodiment wherein the warmth layer 120 is shorter than the touch layer 110, a top portion of the touch layer 110 defining a portion at the head of the bed can fold over a top portion of the warmth layer 120 and connect to the upper surface 131 of the decorative layer 130. A third plurality of attachment points 160 may comprise fasteners 160*b* on the upper surface 111 of the touch layer 110. After assembly of the components described herein, fasteners 160*b* may attach to complementary fasteners 160*a* on an upper surface 131 of the decorative layer 130 (shown in FIG. 3*a*). The fasteners 160*b* may be dispersed along the edge of the upper surface 111 of the touch layer 110 at the head of the bed. Correspondingly, the fasteners 160*a* may be dispersed only along the edge of the decorative layer 130 towards the head of the bed. The fasteners 160*a*, 160*b* at the third plurality of attachment points 160 may fit together to removably attach the top portion of the touch layer 110 to the decorative layer 130 when the top portion is folded over the decorative layer 130. In an embodiment, the fasteners comprise snaps. In other embodiments, as noted above, the fasteners may comprise buttons, hook and loop fasteners, magnets, clips, and the like, as would be understood by persons of ordinary skill in the art.

In another embodiment, the warmth layer 120 comprises the same dimensions as the touch layer 110. The fasteners 140*a* may be dispersed along all four edges of the upper surface 111 of the touch layer 110—the edges at the foot and head of the bed and the side edges—to correspond the fasteners 140*b* dispersed along all four edges of the lower surface of the warmth layer 122. In other embodiments, the warmth layer 120 may be narrower than the touch layer 110.

Figure 1B:
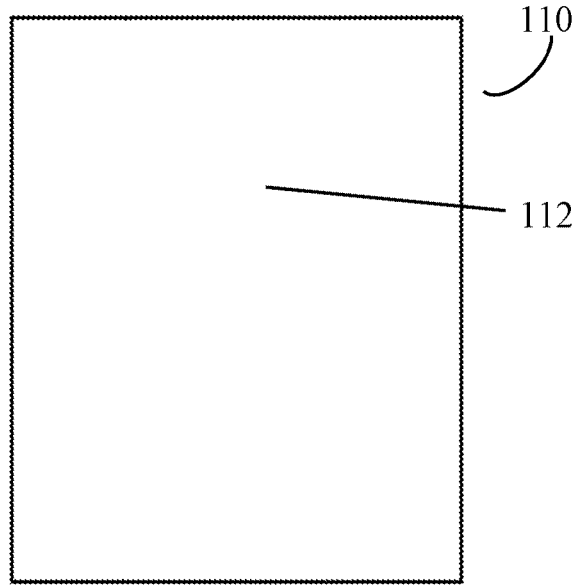
FIG. 1b is a bottom view of the touch layer of an embodiment of the present invention.

Referring now to FIG. 1*b*, the touch layer 110 may further comprise a lower surface 112. The lower surface 112 of the touch layer 110 may cover a fitted sheet (not shown) when the bed is made and unoccupied. The lower surface 112 of the touch layer 110 may also be the surface that contacts the user. In an embodiment, the lower surface 112 of the touch layer 110 does not comprise attachment points. In another embodiment, the lower surface 112 of the touch layer 110 comprises attachment points which may serve to attach portions of the touch layer 110 to a fitted sheet.

Figure 2A:
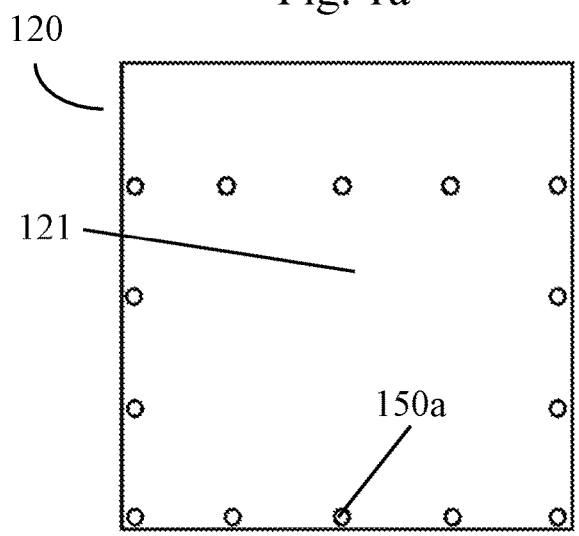
FIG. 2a is a top view of the warmth layer of an embodiment of the present invention.

Referring now to FIG. 2*a*, the warmth layer 120 may comprise an upper surface 121. A second plurality of attachment points 150 may comprise fasteners 150*a* on the upper surface 121 of the warmth layer 120. After assembly of the components described herein, fasteners 150*a* may attach to complementary fasteners 150*b* on a lower surface 132 of the decorative layer 130 (shown in FIG. 3*b*).

In an embodiment, the decorative layer 130 may be shorter than the warmth layer 120 such that the side edges of the decorative layer 130 are shorter than the side edges of the warmth layer 120. The fasteners 150*b* may be dispersed along all four edges of the lower surface of the decorative layer. The fasteners 150*a* on the upper surface 121 of the warmth layer 120 may be correspondingly dispersed, so as to align with the fasteners 150*a* when the decorative layer 130 is placed on the warmth layer 120. In other words, the fasteners 150*a* on the upper surface 121 of the warmth layer 120 are dispersed along 1) the edge at the foot of the bed, 2) portions of the side edges where these portions are of equal length to the side edges of the decorative layer 130, and 3) a line across the upper surface 121 of the warmth layer 120, such that the line corresponds to the edge towards the head of the bed of the decorative layer 130.

In another embodiment, the decorative layer 130 comprises the same dimensions as the warmth layer 120. The fasteners 150*a* may be dispersed along all four edges of the upper surface 121 of the warmth layer 120—the edges at the foot and head of the bed and the side edges—to correspond the fasteners 150*b* dispersed along all four edges of the lower surface 132 of the decorative layer 130.

The fasteners 150*a*, 150*b* at the second plurality of attachment points 150 may fit together to removably attach the warmth layer 120 to the decorative layer 130. In an embodiment, the fasteners comprise snaps. In other embodiments, the fasteners may comprise buttons, hook and loop fasteners, magnets, clips, and the like, as understood by persons of ordinary skill in the art.

Figure 2B:
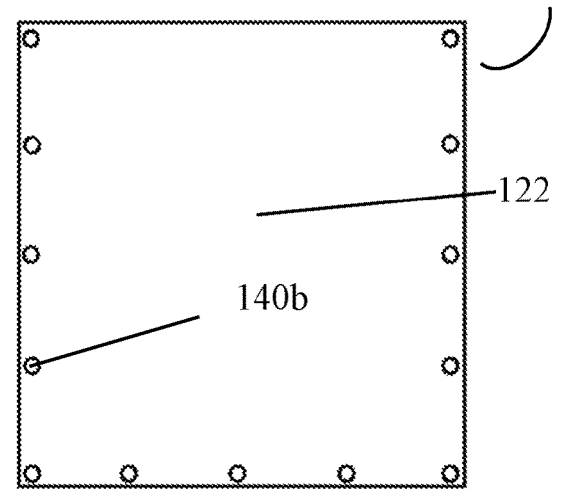
FIG. 2b is a bottom view of the warmth layer of an embodiment of the present invention.

Referring now to FIG. 2*b*, the warmth layer 120 may further comprise a lower surface 122. The fasteners 140*b* at the first plurality of attachment points 140 may be dispersed along three edges of the lower surface of the warmth layer 122: the edge at the foot of the bed and the two side edges. The fasteners 140*b* align with the fasteners 140*a* (shown in FIG. 1*a*).

Figure 3A:
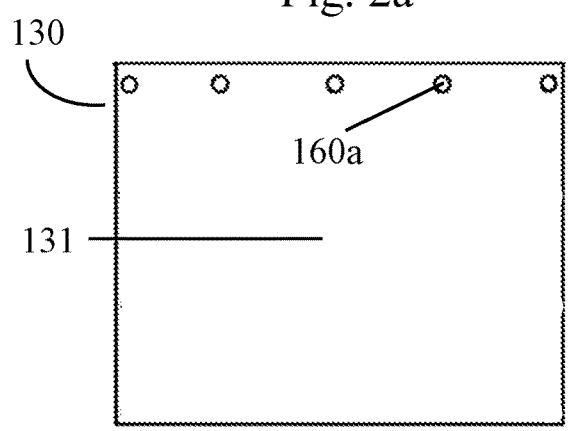
FIG. 3a is a top view of the decorative layer of an embodiment of the present invention.

Referring now to FIG. 3*a*, the decorative layer 130 may comprise an upper surface 131. In an embodiment, a top portion of the touch layer 110 defining a portion at the head of the bed can fold over a top portion of the warmth layer 120 and connect to the upper surface 131 of the decorative layer 130. The third plurality of attachment points 160 may comprise fasteners 160*b* on the upper surface 111 of the touch layer 110 (shown in FIG. 1*a*) and complementary fasteners 160*a* on an upper surface 131 of the decorative layer 130. The fasteners 160*b* may be dispersed along the edge of the upper surface 111 of the touch layer 110 at the head of the bed. Correspondingly, the fasteners 160*a* may be dispersed only along the edge of the decorative layer 130 towards the head of the bed. The fasteners 160*a*, 160*b* at the third plurality of attachment points 160 may fit together to removably attach the top portion of the touch layer 110 to a decorative layer 130.

Figure 3B:
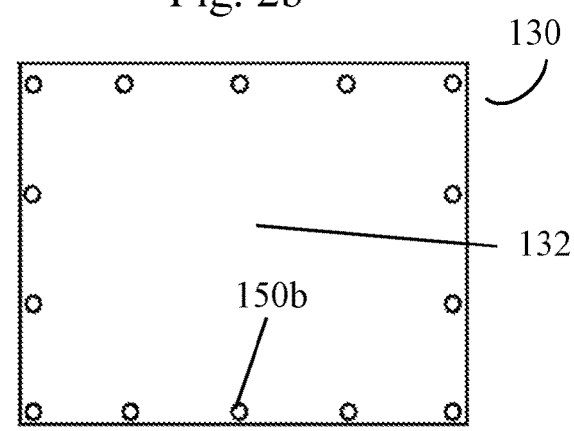
FIG. 3b is a bottom view of the decorative layer of an embodiment of the present invention.

Referring now to FIG. 3*b*, the decorative layer 130 may further comprise a lower surface 132. The second plurality of attachment points 150 may comprise fasteners 150*a* on the upper surface 121 of the warmth layer 120 (shown in FIG. 2*a*) and complementary fasteners 150*b* on a lower surface 132 of the decorative layer 130.

The fasteners 150*b* may be dispersed along all four edges of the lower surface 132 of the decorative layer 130. The fasteners 150*a* on the upper surface 121 of the warmth layer 120 may be correspondingly dispersed, so as to align with the fasteners 150*b* when the decorative layer 130 is placed on the warmth layer 120.

In an embodiment wherein the decorative layer 130 is shorter than the warmth layer 120, the fasteners 150*a* on the upper surface 121 of the warmth layer 120 may be dispersed along 1) the edge at the foot of the bed, 2) portions of the side edges that are of equal length to the side edges of the decorative layer 130, and 3) a line across the upper surface 121 of the warmth layer 120 connecting the two portions of side edges, such that the line corresponds to the edge at the head of the bed of the decorative layer 130.

In an embodiment wherein the decorative layer 130 has the same length and width dimensions as the warmth layer 120, the fasteners 150a may be dispersed along all four edges of the upper surface 121 of the warmth layer 120 and the fasteners 150b may be dispersed along all four edges of the lower surface 132 of the decorative layer 130.

Figure 4:
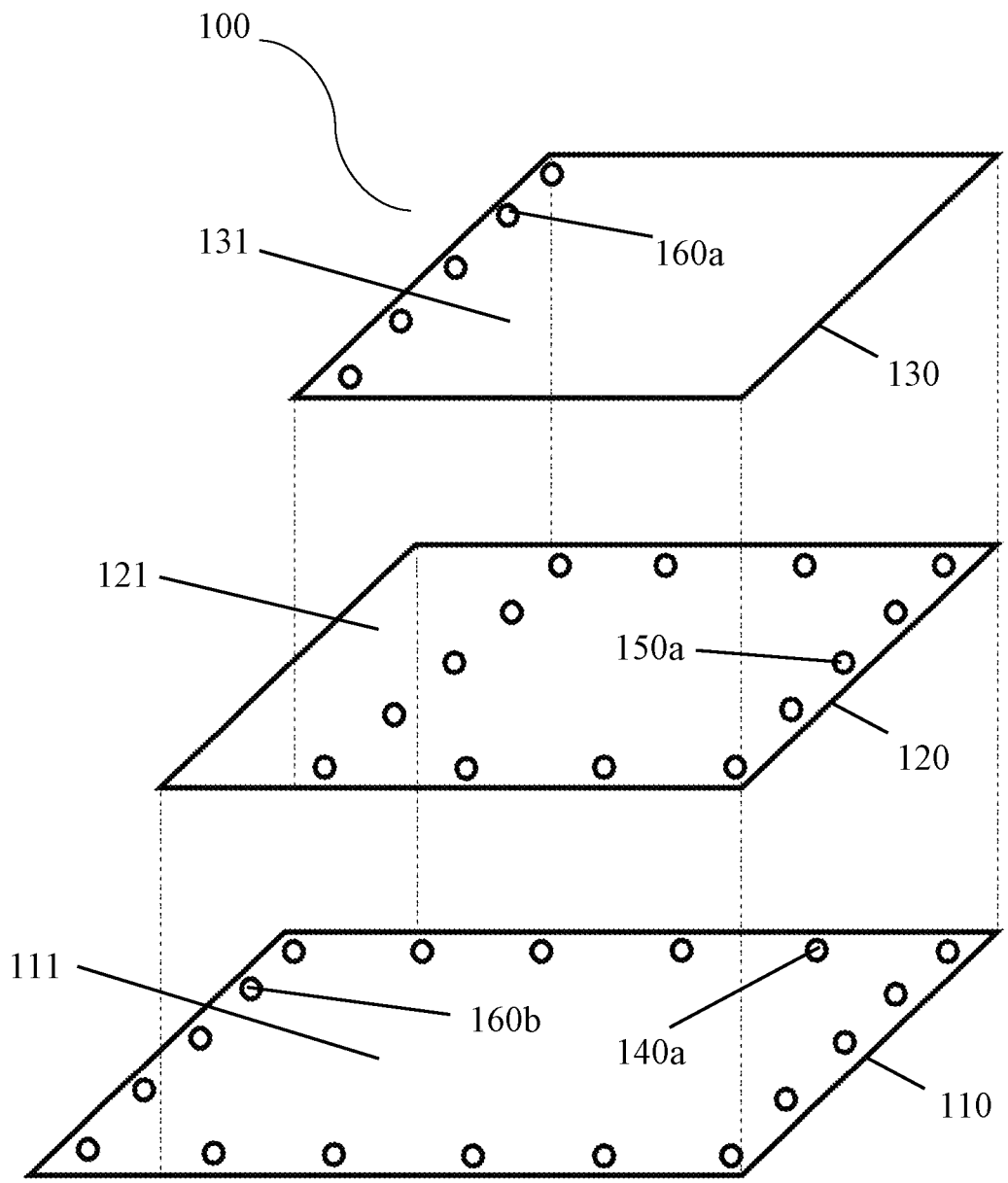
FIG. 4 is an exploded perspective view showing the upper surface of the touch layer, the upper surface of the warmth layer, and the upper surface of the decorative layer of an embodiment of the present invention.
Figure 5:
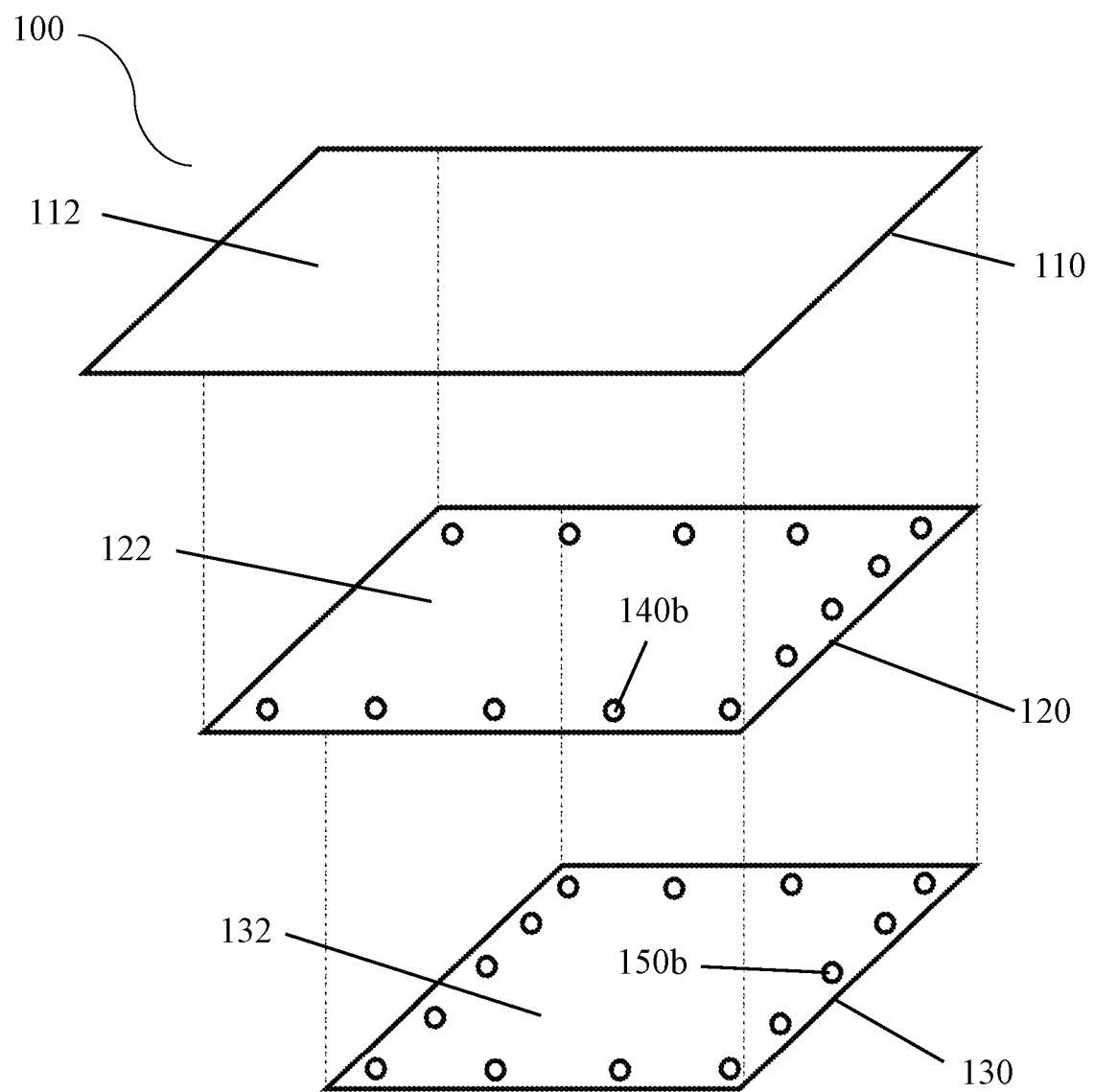
FIG. 5 is an exploded perspective view showing the lower surface of the touch layer, the lower surface of the warmth layer, and the lower surface of the decorative layer of an embodiment of the present invention.

Referring now to FIG. 4, the warmth layer 120 may be removably attached to the touch layer 110 and the decorative layer 130 may be removably attached to the warmth layer 120. In an embodiment, the warmth layer 120 has a shorter length than the touch layer 110 and decorative layer 130 has a shorter length than the warmth layer 120. The layers may align such that the edges at the foot of the bed are in alignment, but the edges at the head of the bed are not in alignment if the layers are spread out flat. FIG. 5 shows the system described above from an underside view.

In another embodiment, the touch layer 110, the warmth layer 120, and the decorative layer 130 have equal length and width dimensions. The edges at the foot of the bed and the edges at the head of the bed may be in alignment.

Figures 10A, 10B:
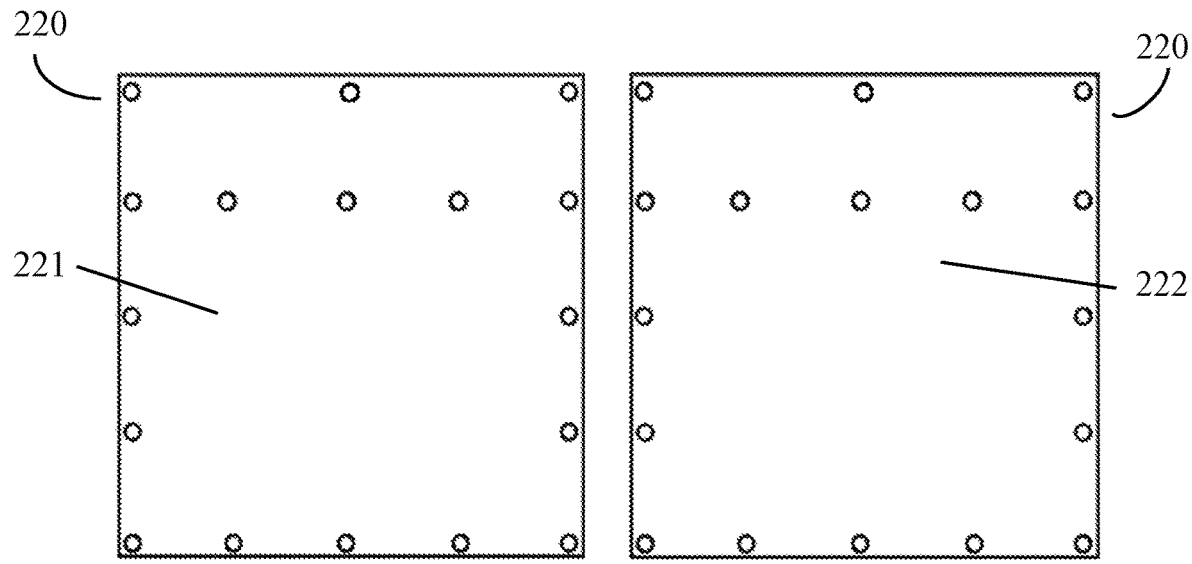
FIG. 10a is a top view of a parallel sublayer layer of an embodiment of the present invention.
FIG. 10b is a bottom view of a parallel sublayer layer of an embodiment of the present invention.

In another embodiment, the warmth layer may comprise two or more parallel sublayers 220. For example, a first parallel sublayer and a second parallel sublayer may be stacked together to form the warmth layer. The first parallel sublayer and the second parallel sublayer may be removably attached via a fourth plurality of fasteners. A third parallel sublayer could be added with a fifth plurality of fasteners. FIGS. 10a and 10b show an embodiment of a parallel sublayer 220 comprising an upper surface 221 (FIG. 10a) and a lower surface 222 (FIG. 10b).

Figures 11A, 11B:
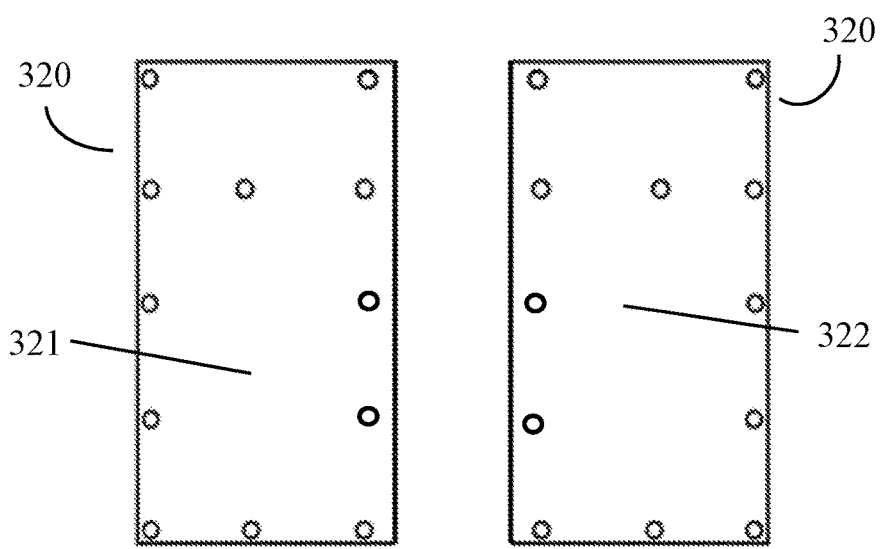
FIG. 11a is a top view of a half layer of an embodiment of the present invention.
FIG. 11b is a bottom view of a half layer of an embodiment of the present invention.

In another embodiment, the warmth layer may comprise a first half warmth layer and a second half warmth layer, each occupying approximately half the area of the warmth layer 120. The first half warmth layer and the second half warmth layer may comprise different thicknesses so as to accommodate two different warmth preferences. This will allow two people who have differing warmth preferences to comfortably share a bed. FIGS. 11a and 11b show an embodiment of a half warmth layer 320 comprising an upper surface 321 (FIG. 11a) and a lower surface 322 (FIG. 11b).

Figure 6:
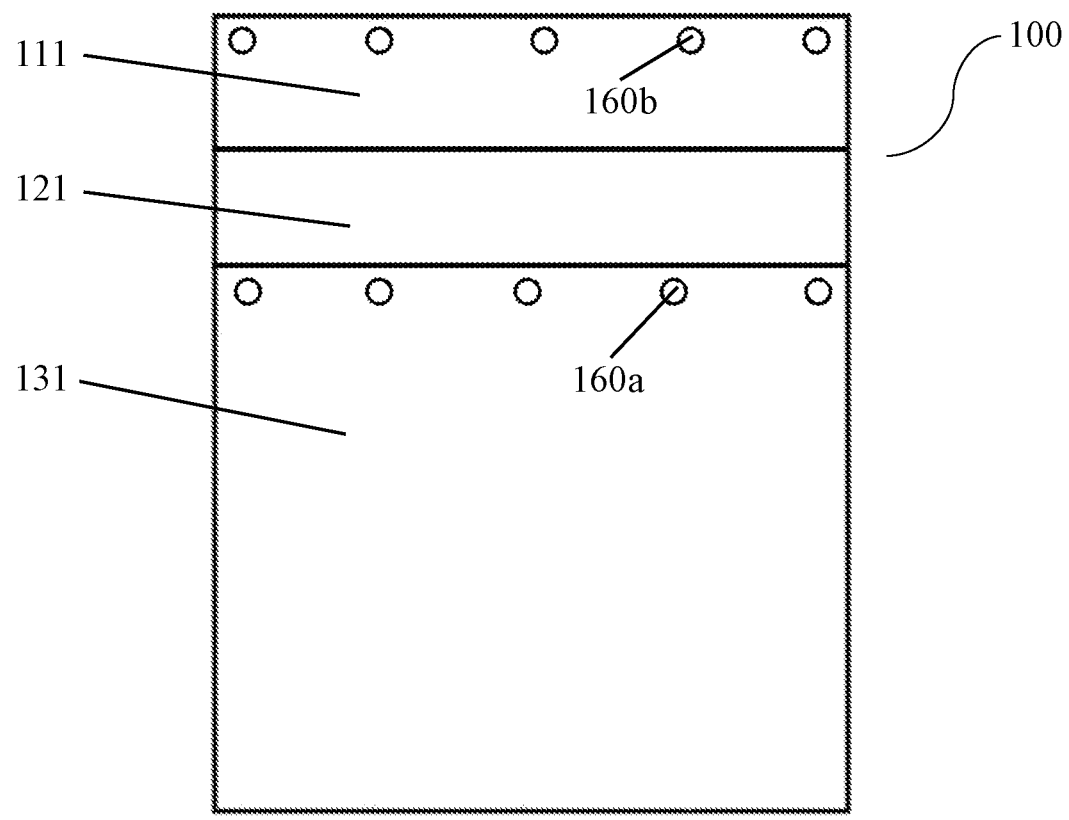
FIG. 6 is a top view of an embodiment of the assembled bedding without the top sheet folded over to connect to the decorative layer.

Referring now to FIG. 6, in an embodiment, the warmth layer 120 is attached to the touch layer 110 via the first plurality of attachment points 140 and the decorative layer 130 is attached to the warmth layer 120 via the second plurality of attachment points 150. The warmth layer 120 may be shorter than the touch layer 110 such that when the layers are connected, a top portion of the upper surface of the touch layer 111 is exposed. The top portion of the upper surface 111 of the touch layer 110 may comprise the fasteners 160b. Moreover, the decorative layer 130 may shorter than shorter than the warmth layer 120 such that when the layers are connected, a top portion of the upper surface 121 of the warmth layer 120 is exposed. The fasteners 160a may be dispersed along the edge at the head of the upper surface 131 of the decorative layer 130.

In other embodiments, the warmth layer 120 may be the same length as the touch layer 110 and the decorative layer 130 may be the same length as the touch layer 110.

Figure 7:
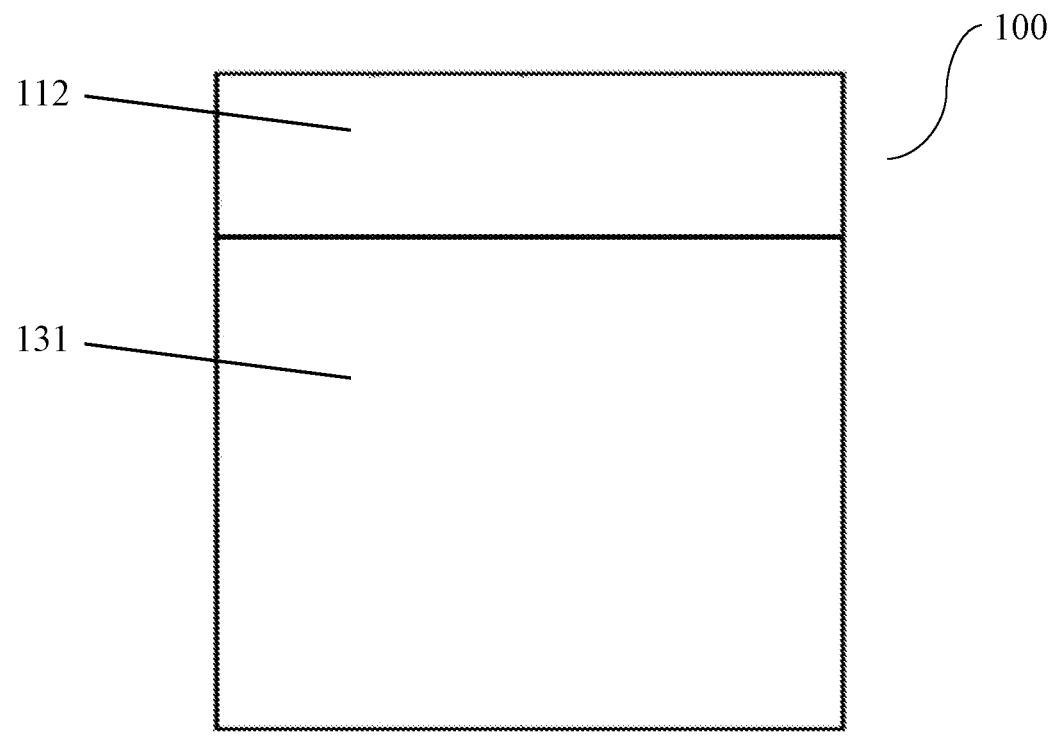
FIG. 7 is a top view of an embodiment of the assembled bedding with the top sheet folded over to connect to the decorative layer.

Referring now to FIG. 7, in an embodiment wherein the warmth layer 120 is shorter than the touch layer 110 and the decorative layer 130 is shorter than the warmth layer 120, the top portion of the touch layer 110 may fold over the top portion of the warmth layer 120 and connect to the upper surface 131 of the decorative layer 130 via the third plurality of attachment points 160. The fasteners 160b on the upper surface of the touch layer 111 may connect to the fasteners 160a on the upper surface 131 of the decorative layer 130.

Figure 8:
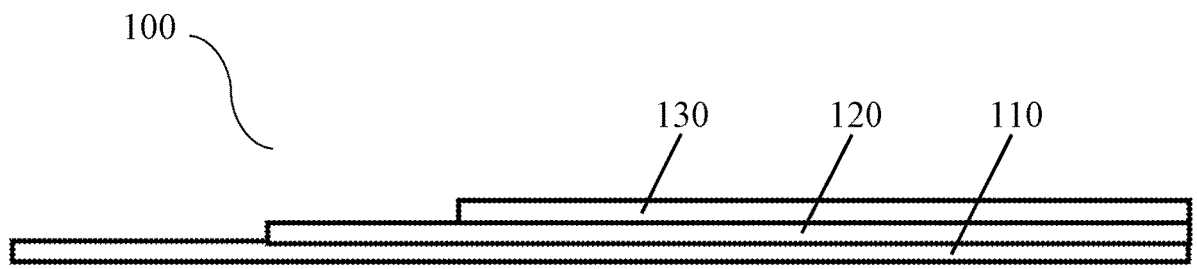
FIG. 8 is a cross-sectional view of FIG. 6.

Referring now to FIG. 8, in an embodiment, the warmth layer 120 is attached to the touch layer 110 and the decorative layer 130 is attached to the warmth layer 120. FIG. 8 is a cross-sectional view of FIG. 6.

Figure 9:
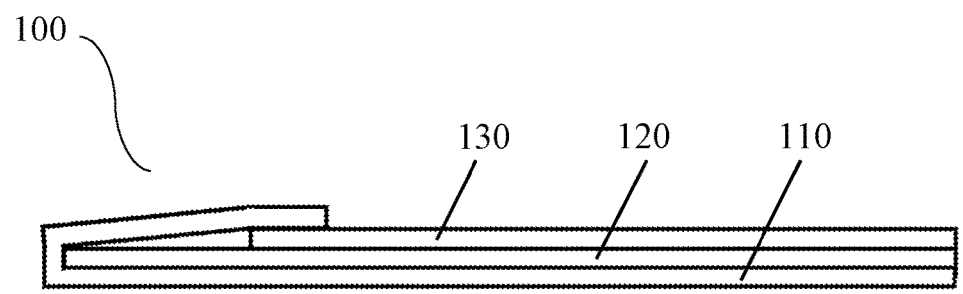
FIG. 9 is a cross-sectional view of FIG. 7.

Referring now to FIG. 9, in an embodiment, the warmth layer 120 is attached to the touch layer 110 and the decorative layer 130 is attached to the warmth layer 120. The top portion of the touch layer 110—which defines a portion at the head of the bed—may also fold over a top portion of the warmth layer 120 and connect to the decorative layer 130. FIG. 9 is a cross-sectional view of FIG. 7.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bedding assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims.

REFERENCE NUMBER LIST

| Reference Number | Part Name |
| --- | --- |
| 100 | Bedding assembly |
| 110 | Touch Layer |
| 111 | Upper Surface of the Touch Layer |
| 112 | Lower Surface of the Touch Layer |
| 120 | Warmth Layer |
| 121 | Upper Surface of the Warmth Layer |
| 122 | Lower Surface of the Warmth Layer |
| 130 | Decorative Layer |
| 131 | Upper Surface of the Decorative Layer |
| 132 | Lower Surface of the Decorative Layer |
| 140a | Fasteners on the Bottom Portion of the Upper Surface of the Touch Layer |
| 140b | Fasteners on the Lower Surface of the Warmth Layer |
| 150a | Fasteners on the Upper Surface of the Warmth Layer |
| 150b | Fasteners on the Lower Surface of the Decorative Layer |
| 160a | Fasteners on the Upper Surface of the Decorative Layer |
| 160b | Fasteners on the Top Portion of the Upper Surface of the Touch Layer |
| 220 | Parallel Sublayer |
| 221 | Upper Surface of the Parallel Sublayer |
| 222 | Lower Surface of the Parallel Sublayer |

-continued

| Reference Number | Part Name |
|---|---|
| 320 | Half Layer |
| 321 | Upper Surface of the Half Layer |
| 322 | Lower Surface of the Half Layer |

What is claimed is:

1. Bedding comprising:
a touch layer comprising an upper surface of the touch layer and a lower surface of the touch layer;
a warmth layer comprising an upper surface of the warmth layer and lower surface of the warmth layer; and
a decorative layer comprising an upper surface of the decorative layer and a lower surface of the decorative layer,
wherein a bottom portion of the upper surface of the touch layer is attachable to the lower surface of the warmth layer using a first plurality of fasteners,
wherein the upper surface of the warmth layer is attachable to the lower surface of the decorative layer using a second plurality of fasteners, and
wherein a top portion of the upper surface of the touch layer is foldable over a top portion of the warmth layer and is attachable to the upper surface of the decorative layer using a third plurality of fasteners,
wherein the warmth layer comprises:
a first parallel sublayer; and
a second parallel sublayer,
wherein a lower surface of the first parallel sublayer comprises the lower surface of the warmth layer and an upper surface of the second parallel sublayer layer comprises the upper surface of the warmth layer, and
wherein an upper surface of the first parallel sublayer is attachable to a lower surface of the second parallel sublayer using a fourth plurality of fasteners.

2. The bedding of claim 1, wherein the fourth plurality of fasteners comprises one or more of snaps, buttons, hook and loop fasteners, magnets, and clips.

3. The bedding of claim 1, wherein the first parallel sublayer and the second parallel sublayer have the same approximate thickness.

4. The bedding of claim 1, wherein the first parallel sublayer and the second parallel sublayer have different thicknesses.

5. The bedding of claim 1, wherein the first plurality of fasteners, the second plurality of fasteners, and the third plurality of fasteners comprise one or more of snaps, buttons, hook and loop fasteners, magnets, and clips.

6. Bedding comprising:
a touch layer comprising an upper surface of the touch layer and a lower surface of the touch layer;
a warmth layer comprising an upper surface of the warmth layer and lower surface of the warmth layer; and
a decorative layer comprising an upper surface of the decorative layer and a lower surface of the decorative layer,
wherein a bottom portion of the upper surface of the touch layer is attachable to the lower surface of the warmth layer using a first plurality of fasteners,
wherein the upper surface of the warmth layer is attachable to the lower surface of the decorative layer using a second plurality of fasteners, and
wherein a top portion of the upper surface of the touch layer is foldable over a top portion of the warmth layer and is attachable to the upper surface of the decorative layer using a third plurality of fasteners,
wherein the warmth layer comprises:
a first parallel sublayer;
a second parallel sublayer; and
a third parallel sublayer,
wherein a lower surface of the first parallel sublayer comprises the lower surface of the warmth layer and an upper surface of the third parallel sublayer layer comprises the upper surface of the warmth layer,
wherein an upper surface of the first parallel sublayer is attachable to a lower surface of the second parallel sublayer using a fourth plurality of fasteners, and
wherein an upper surface of the second parallel sublayer is attachable to a lower surface of the third parallel sublayer using a fifth plurality of fasteners.

7. The bedding of claim 6, wherein the fourth plurality of fasteners and the fifth plurality of fasteners comprise one or more of snaps, buttons, hook and loop fasteners, magnets, and clips.

8. The bedding of claim 6, wherein the first plurality of fasteners, the second plurality of fasteners, and the third plurality of fasteners comprise one or more of snaps, buttons, hook and loop fasteners, magnets, and clips.

9. Bedding comprising:
a touch layer comprising an upper surface of the touch layer and a lower surface of the touch layer;
a warmth layer comprising an upper surface of the warmth layer and lower surface of the warmth layer; and
a decorative layer comprising an upper surface of the decorative layer and a lower surface of the decorative layer,
wherein a bottom portion of the upper surface of the touch layer is attachable to the lower surface of the warmth layer using a first plurality of fasteners,
wherein the upper surface of the warmth layer is attachable to the lower surface of the decorative layer using a second plurality of fasteners, and
wherein a top portion of the upper surface of the touch layer is foldable over a top portion of the warmth layer and is attachable to the upper surface of the decorative layer using a third plurality of fasteners,
wherein the warmth layer defines a length of the warmth layer and a width of the warmth layer,
the warmth layer further comprising:
a first half warmth layer; and
a second half warmth layer,
wherein respective widths of the first and second half warmth layers are
each equal to approximately one half the width of the warmth layer, and
wherein the first half warmth layer and the second half warmth layer comprise different thicknesses.

10. The bedding of claim 9, wherein the first plurality of fasteners, the second plurality of fasteners, and the third plurality of fasteners comprise one or more of snaps, buttons, hook and loop fasteners, magnets, and clips.

* * * * *